Sept. 29, 1959 J. K. LITTLE 2,907,013

ELECTRICAL SIGNALING SYSTEM

Filed Dec. 13, 1954 2 Sheets-Sheet 1

INVENTOR.
James K. Little

BY [signature]
ATTORNEY.

Sept. 29, 1959 J. K. LITTLE 2,907,013

ELECTRICAL SIGNALING SYSTEM

Filed Dec. 13, 1954

2 Sheets-Sheet 2

INVENTOR.
James K. Little

BY [signature]
ATTORNEY.

United States Patent Office 2,907,013
Patented Sept. 29, 1959

2,907,013

ELECTRICAL SIGNALING SYSTEM

James K. Little, Oklahoma City, Okla.

Application December 13, 1954, Serial No. 474,845
2 Claims. (Cl. 340—227)

This invention relates to the field of electrical signaling apparatus and, more particularly, to such apparatus for signaling at a local station any change of temperature from a predetermined range of temperatures occurring at a distant, remotely located station.

This invention is especially adapted for use in establishing a central station system for receiving indications of temperature changes which may occur at any of a plurality of refrigeration units or the like located at different remote premises such as grocery stores and warehousing facilities for perishable goods. The proprietors of such establishments wherein perishable goods must be kept have heretofore been required to keep personnel on duty during the night and on holidays when the establishment is not open for the normal conduct of business, or to assume the risk of serious loss through damage to merchandise resulting from the failure of refrigeration or other temperature maintaining equipment. Many perishable goods such as kept by super-markets and the like are, and to prevent spoilage, must be maintained at a temperature within a very narrow temperature range. During regular business hours, the proprietor and his regular personnel may keep a close check upon the maintenance of such temperatures. However, when the store or other facility is closed, for instance at night, a failure in the refrigerating equipment can result in complete spoilage within just a few hours from the time of such failure.

Accordingly, it is one of the most important objects of this invention to provide apparatus for furnishing to such places of business a service for warning the proprietor or procuring the immediate services of a repairman whenever a danger signal indicating a change of temperature beyond a predetermined range occurs during non-business hours. The apparatus contemplated by this invention is particularly adapted for such purpose, since it is of a nature permitting an economically practicable operation wherein many distant sensing stations may be located at various remote business facilities and all tied in to both a common warning device and individual indicating devices located at a single, central local station.

It is another important object of this invention to provide such apparatus that may utilize as a part thereof existing transmission line facilities in the nature of telephone lines which can be made available for signaling systems only under certain conditions prescribed by regulatory authority and the telephone companies for safeguarding the telephone company's equipment and personnel, as well as other users of the telephone company's services.

It is another important object of this invention to provide simple, fool proof and inexpensive structure which may be used in combination to achieve the remote signaling results desired.

It is still another important object of this invention to provide a temperature responsive electrical switching mechanism utilizing a temperature responsive, pressure controlling bulb connected with a Bourdon tube type, pressure responsive gauge having electrical switching means associated with its indicator.

It is still another important object of this invention to provide such switching means adapted for selective adjustment to vary either or both of the width or the median temperature of a range of temperatures within which the switching mechanism is electrically operative.

Still other important objects of this invention, including significant details of construction, will be made clear or become apparent as the following description of the invention progresses.

Figure 1:
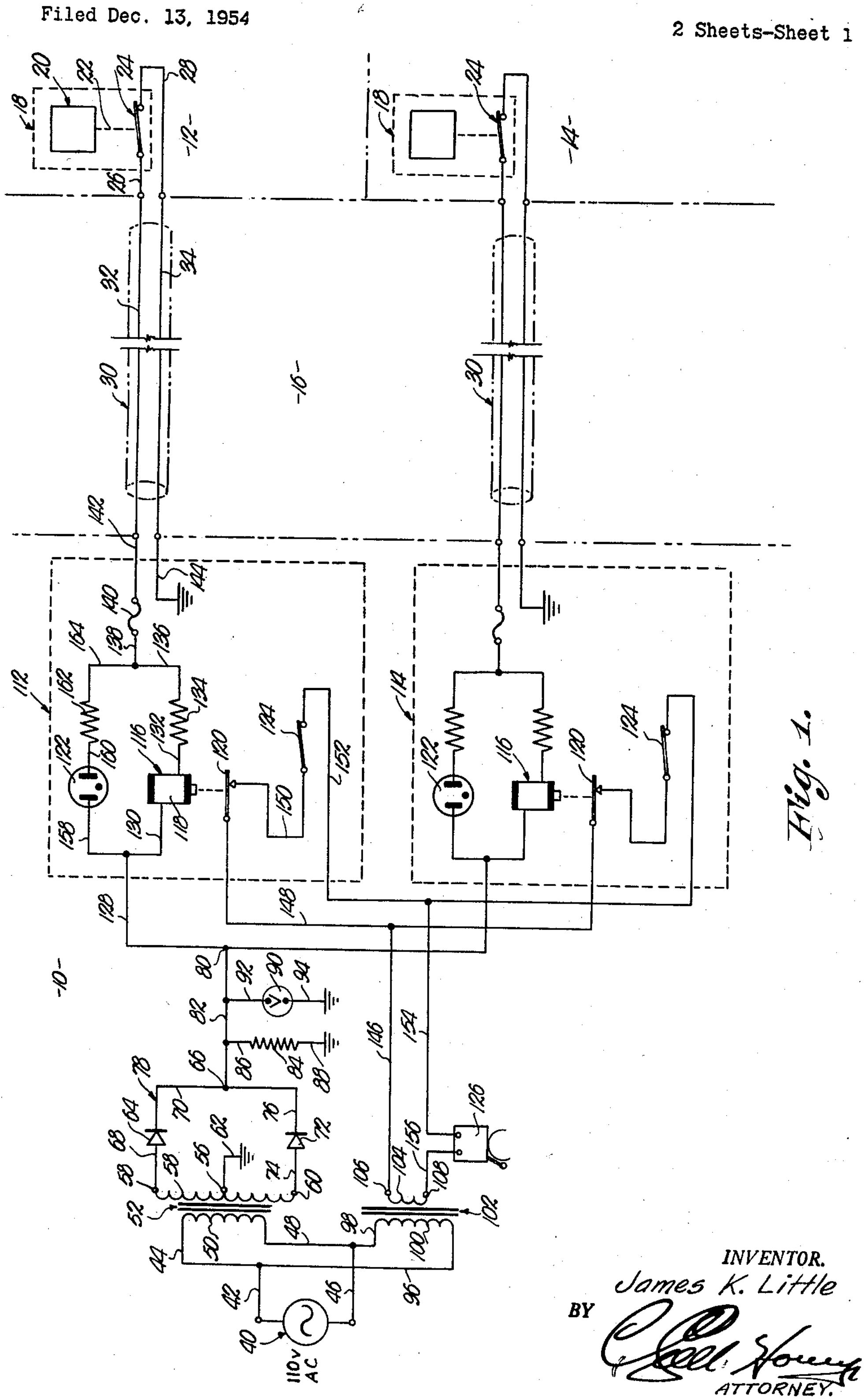
Fig. 1 is a schematic diagram of the electrical circuitry utilized in the invention.

Referring first to Fig. 1 the numeral 10 generally designates a central, local station, the numerals 12 and 14 respectively designate generally a pair of remote, temperature sensing stations, and the numeral 16 generally designates a distance or space intervening between local station 10 and the various distant stations 12 and 14 (it being understood that the invention contemplates any reasonable plurality of distant stations 12—14, etc., of which only two are shown for illustration). Each of the distant stations 12 and 14 includes a temperature responsive, electrical switching assembly generally designated 18 each of which includes temperature sensing apparatus generally designated 20 operably coupled as indicated by the dotted line 22 with a single pole, single throw electrical switch 24 which is normally closed when the temperature sensed by apparatus 20 is within a certain preselected range of temperature.

Apparatus 20, it will be understood, will normally be located within the refrigerator or other temperature controlling unit of a grocery store or other place of business keeping perishable goods, the details of the preferred form of assemblies 18 being hereinafter more fully explained.

Each of the switches 24 is coupled by a pair of conductors 26 and 28 with a conventional telephone line generally designated 30 normally having a pair of wires 32 and 34, although it is noted that one of the wires, for instance 34, could be replaced by ground, if desired. Each of telephone lines 30 may extend for distances up to at least about fifteen miles, it being noted that the indicating equipment provided at the local station 10 is particularly adapted for use with such long lengths of line 30 without resorting to voltage and current values unsuitable for connection with telephone company facilities.

Referring now particularly to the local station 10, there is provided a source of electrical power generally designated 40, which may be an ordinary alternating current main or an independent local generator where it is desired to guard against interruption of service during interruptions of commercial power supply. Source 40 is coupled by conductors 42—44 and 46—48 with a primary winding 50 of a step-up transformer 52 having a high voltage secondary winding 54 provided with a tap 56 and a pair of end terminals 58 and 60. Center tap 56 is grounded by a conductor as at 62. A suitable electrical rectifying device 64, which may be a selenium rectifier for instance, is coupled in series between secondary terminal 58 and a high voltage, direct current supply terminal 66 by means of conductors 68 and 70. Similarly, an electrical rectifying unit 72 is coupled in series between secondary terminal 60 and high voltage terminal 66 by a pair of conductors 74 and 76. It is significant that rectifier unit 64 and 72 are so disposed and polarized within the circuit as to both permit flow of electrical current only to or from high voltage terminal 66. The arrangement thus described obviously presents a rectifying circuit generally designated by the numeral 78 for converting high voltage alternating current power supplied by secondary winding 54 into a supply of high voltage direct current potential presented between terminal 66 and ground. A direct current voltage delivery terminal 80 is coupled with terminal 66 of rectifier circuit 78 by conductive means 82, a load or bleeder resistor 84 being coupled between conductor 82 and ground by conductors 86 and 88. If desired, a voltmeter 90 may be provided and coupled between conductor 82 and ground by conductors 92 and 94.

Source 40 is also coupled by conductors 42—96 and 46—98 with the primary winding 100 of a step-down transformer 102 having a low voltage secondary winding 104 provided with a pair of output terminals 106 and 108. It may be noted that suitable voltages for operation of the equipment of this invention would be a direct current potential of one hundred volts between terminal 80 and ground and an alternating current potential between terminals 106 and 108 of approximately six volts or the like.

Local station 10 also includes a plurality of local indicating and control switching assemblies generally designated 112, 114, etc., it being understood that there is such an assembly 112 et seq., for each of temperature responsive assemblies 18. Each of assemblies 112, 114, et seq., includes a relay generally designated 116 having a coil 118 and a normally closed, single pole, single throw switch 120 associated therewith. Such assemblies 112, et seq., also include a gaseous discharge indicating device 122, which may be an ordinary neon lamp, and a single pole, single throw, manually operable, cut-off switch 124.

The local station 10 also includes a warning signal device 126 which may be of any suitable nature adapted to unfailingly direct attention to its operation, for instance, a bell or the like.

The coil 118 of each relay 116 is coupled by conductors 128 and 130 with high voltage terminal 80. The other side of coil 118 is coupled by conductors 132, a limiting resistor 134, conductors 136 and 138, a fuse 140 and a conductor 142 with wire 32 of telephone line 30. Wire 34 of telephone line 30 is grounded by a conductor at local station 10 as indicated at 144. It will thus be apparent that coil 118, resistor 134, fuse 140, telephone wire 32, distant switch 24, and telephone wire 34 are coupled in series between terminal 80 and ground or across the high voltage, direct current output of rectifier circuit 78. It will, therefore, be apparent that, with voltage being supplied to terminal 80, coil 118 will remain energized so long as distant switch 24 is closed. As will be hereinafter more fully explained, switch 24 will be closed whenever the temperature at the distant station 12 or 14 is within the predetermined desired range.

Energization of relay coil 118, which is normal when all is well at the distant station 12 or 14 as has just been observed, will open relay switch 120. Relay switch 120, manual cut-off switch 124 and warning signal device 126, are coupled in series between low voltage transformer terminals 106 and 108 by conductors 146, 148, 150, 152, 154 and 156. It is apparent, therefore, that warning bell 126 will normally not be energized and will remain silent so long as relay switch 120 is held open by continued energization of coil 118, which occurs so long as switch 24 is maintained closed by proper temperature sensings from apparatus 20.

It may be observed that each local station assembly 112, 114, et seq., is coupled with power terminal 80 and the switch 24 of a corresponding distant station 12, 14, et seq., in the same manner as described above for assembly 112. Similarly, the relay switches 120 and individual cut-off switches 124 of all of the assemblies 112, 114, et seq., are coupled in parallel with each other so that the closing of any switch 120 will immediately result in energization and operation of the warning bell 126. It is thus clear that if the switch 24 at any of the distant stations 12, 14, et seq., is opened by the temperature at such station deviating from the desired range, the warning bell 126 at the local station 10 will be immediately activated to advise the operator on duty that a mal-functioning of temperature controlling equipment exists at some one (or more) of the distant stations 12, 14, et seq.

In order that the operator at the local station 10 may be advised of the identity of the distant station or stations 12, 14, et seq., whose temperature controlling equipment is not functioning properly, the neon lamp 122 of each assembly 112, 114, et seq., is coupled in parallel with the coil 118 and resistor 134 thereof by means of conductors 158 and 160, a limiting resistor 162, and conductor 164. As is well known to those skilled in the art, the current drawn by a neon indicating tube 122 is so insignificant as to cause no difficulty in connection with the utilization of very substantial lengths of telephone line 30. Obviously, whenever the switch 24 of a distant station 12, 14, et seq., is closed, current may flow from power supply terminal 80 through conductors 128 and 158, neon tube 122, conductor 160, resistor 162, conductors 164 and 138, fuse 140, conductor 142, wire 32, conductor 26, closed switch 24, conductor 28, wire 34 and conductor 144 to ground, thereby energizing and causing the indicator tube 122 to glow. Obviously, whenever a switch 24 is opened by its temperature sensing apparatus 20, the neon indicator tube 122 of the corresponding local station assembly 112, 114, et seq., will cease to glow at the same time that bell 126 is activated by the deenergization of coil 118 and the resulting closing of switch 120. Thus, the operator on duty at local station 110 is not only alerted to the danger condition by bell 126, but is also advised of the particular distant station 12, 14, et seq., at which the mal-function is occurring by virtue of the indicator lamp 122 corresponding thereto ceasing to glow. It should also be noted that the lamps 122 serve an additional, important function by providing a convenient continuity and resistance effect upon the corresponding telephone line 30 under conditions when the corresponding switch 24 is closed, as well as functioning to give a convenient visual assurance that no interruption of operation of the system has occurred through the blowing of fuse 140 or the failure of source 40 or rectifier circuit 78.

Figures 2, 3, 4:
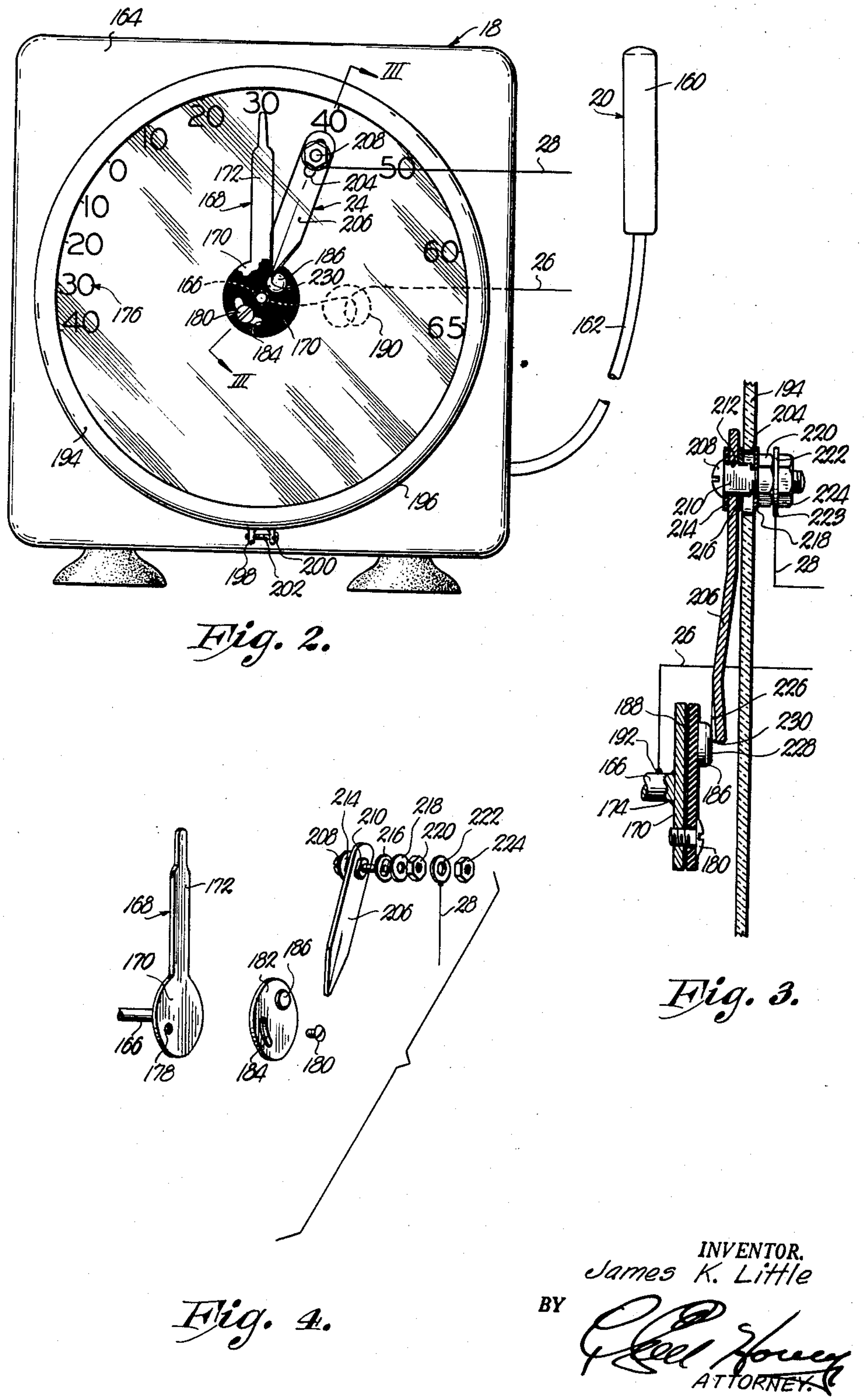
Fig. 2 is a front elevational view of the Bourdon tube type pressure gauge with the temperature bulb coupled therewith and structure for accomplishing the desired electrical switching installed thereon.
Fig. 3 is a fragmentary cross sectional view taken on irregular line III—III of Fig. 2.
Fig. 4 is an exploded view of the indicating shaft and needle of the Bourdon tube type gauge and the auxiliary structure added to the gauge for accomplishing the electrical switching function contemplated by the invention.

Referring now more particularly to Figs. 2, 3 and 4, it will be seen that the temperature responsive switching apparatus 18 includes a temperature sensing, pressure differential creating assembly 20 in the nature of an ordinary temperature bulb 160 filled with a suitable fluid having a significant temperature coefficient of expansion, such as mercury or the like, adapted to exert a fluid pressure corresponding to the temperature of the fluid within bulb 160. Bulb 160 is connected by a fluid line 162 with a Bourdon tube type pressure gauge 164 having a rotatable indictor shaft 166 carrying an indicator needle assembly generally designated 168 and including a circular portion 170 and a needle portion 172. As illustrated in Fig. 3, wall portion 170 may be rigidly secured upon shaft 166 in any suitable manner as by welding or the like as at 174. Gauge 164 is preferably calibrated in terms of temperatures at which bulb 160 is subjected by calibration markings 176. Bearing in mind the nature of a Bourdon tube type pressure gauge, as is well known to those skilled in the art, and the coupling of the same through line 162 with bulb 160, it will be obvious that the rotation of shaft 166 and therefore, the positioning of indicating assembly 168 is directly responsive to the temperature at which bulb 160 is subjected. Normally, the bulb 160 will be disposed within the refrigerated or other temperature controlled space whose temperature is to be monitored.

It may be noted that circular portion 170 of indicator 168 is provided with a threaded hole 178 adapted to receive a holding screw 180. There is provided a circular element of insulating material 182 of substantially the same dimensions as circular portion 170 of assembly 168. Element 182 is provided with an elongated, arcuate slot 184 therein through which holding screw 180 may pass for engagement into threaded hole 178 of assembly 168.

Circular element 182 is also provided with a contact member 186 of electrically conducting material which extends through element 182 a distance on each side thereof. Since shaft 166 and circular portion 170 of 168 is of electrically conducting material, it is apparent that contact member 186 will be in electrically connected relationship with shaft 166 through engagement of the rear face 188 of member 186 with circular portion 170 of assembly 168. It will be further apparent that by loosening screw 180 element 182 may be rotated upon circular portion 170 so as to dispose contact member 186 at a different location relative to indicating needle portion 172 of assembly 168, and that screw 180 may then again be tightened into threaded opening 178 at its new position within slot 184 to retain element 182 in the rotated position relative to shaft 166 thus selected. As will later become apparent, this permits selective adjustment of the median temperature of the range during which the switch 24 is closed. If desired, an additional hole similar to 178 could be provided in portion 170 and an additional slot and screw similar to 184 and 180 respectively could be provided for element 182 to permit two-point securement, although such construction has been found unnecessary in practice. Electrical contact between conductor 26 and shaft 166 may be effected in any suitable manner, for instance through means of a take-up or pigtail coil 190 in conductor 26, with the end of conductor 26 secured to shaft 166 by soldering or in any other suitable fashion as indicated at 192.

Gauge 164 is preferably provided with a transparent face cover 194 of glass, plastic or other insulating material which is releasably held in place by a split retainer ring 196 whose adjacent ends are provided with ears 198 and 200 held in position for retaining cover 194 in place by means of a screw 202. Such construction permits removal of face cover 194 to effect any desired adjustments in the position of element 182 relative to shaft 166 and indicating needle 172.

Face cover 194 is provided with an elongated slot 204 having its longitudinal axis disposed radially of the extension of shaft 166. An elongated contact arm 206 is mounted on face cover 194 by means of a bolt 208 having an eccentric portion 210 passing through an opening 212 of corresponding configuration in arm 206 adjacent one end thereof. The eccentricity of bolt portion 210 and opening 212 of arm 206 prevents rotation of arm 206 relative to bolt 208, in order to permit control of the rotated position of arm 206 to a disposition radial to the extended axis of shaft 166 when arm 206 is attached to cover 194 as hereinafter explained.

Bolt 208 passes first through a washer 214, then opening 212 of arm 206, then a washer 216, then perforation 204 of cover 194, then a washer 218, then a holding nut 220, then a contact lug or washer 22, and then a lock nut 224.

The manner of thus installing arm 206 on cover 194 will be clear from Figs. 1 and 3, it being noted that the elongation of perforation or slot 204 in cover 194 permits reciprocation of arm 206 radially of the extended axis of shaft 166. Arm 206 is bent or formed adjacent its end opposite opening 212 to present a line contacting portion

226 formed by the V-shaped cross section of the arm 206 throughout the zone of bend. Arm 206 is obviously disposed on the inner side of gauge cover 194 and is reciprocable to a position for electrically contacting relationship between line portion 226 of arm 206 and contact member 186. Electrical connection between conductor 28 and arm 206 is effected by securing conductor 28 to conductive washer 222 as at 223, the conductive bolt 208, washers 214, 216 and nut 220 and 222 thereby completing the circuit.

It will be noted that contact member 186 is provided with a circular contacting face 228, the circular configuration of face 228 being most significant by virtue of the fact that by reciprocation of arm 206 angular distance of rotation of element 182, and therefore, shaft 166, through which portion 226 will engage contact member 186, can be controlled. Thus, by reciprocating arm 206 to dispose the end 230 of portion 226 of arm 206 for contacting the greatest arc on contact member 186, the greatest range of temperature variation which the apparatus 18 will tolerate while maintaining the switch 24 closed, is availed of. On the other hand, by reciprocating arm 206 outwardly, radially of the extended axis of shaft 166, end 230 of portion 226 will contact member 186 through a lesser arc of rotation of element 182, and the temperature range for closure of switch 24 will be correspondingly narrowed.

It is thus apparent that the apparatus of this invention provides both efficient, simple, fool proof and inexpensive apparatus for attaining the objects mentioned above. It will be apparent, however, that certain minor modifications and changes could be made from the precise structure disclosed without materially departing from the true spirit of the invention, accordingly, it is to be understood that this invention shall be deemed limited only by the scope of the appended claims.

Having thus described the invention, what is claimed as new and desired to be secured by Letters Patent is:

1. Remote temperature signaling apparatus comprising a distant station including a temperature sensitive, normally closed, single pole, single throw, switching mechanism adapted to open whenever a temperature being monitored departs from a predetermined range of values; a local station including a source of electrical power, a normally energized, signaling component, a relay having a coil and a normally closed, single pole, single throw switch adapted to be opened when the coil is energized, a first operating circuit coupling said component and said coil in parallel with each other, a normally deenergized, signaling device, and a second operating circuit coupling the device and the relay switch in series with each other and effectively in series with the source; and a control circuit including a telephone line circuit coupling the mechanism and the relay coil in series with each other and effectively in series with the source.

2. Remote temperature signaling apparatus comprising a plurality of distant stations each including a temperature sensitive, normally closed, single pole, single throw, switching mechanism adapted to open whenever a temperature being monitored departs from a predetermined range of values; a single local station including a source of electrical power, a single, normally deenergized, signaling device, a relay for each distant station respectively each having a coil and a normally closed, single pole, single throw switch adapted to be opened when the coil is energized, a normally deenergized indicating component for each relay respectively, a switch circuit coupling all of said relay switches in parallel, an operating circuit coupling the device and said switch circuit in series with each other and effectively in series with the source, and an indicating circuit coupling each of said components in parallel with a corresponding relay coil; and a control circuit for each of said distant stations respectively, each control circuit including a telephone line circuit coupling a corresponding mechanism and relay coil in series with each other and effectively in series with the source.

References Cited in the file of this patent

UNITED STATES PATENTS

| | | |
|---|---|---|
| 1,953,441 | Souney | Apr. 3, 1934 |
| 2,000,074 | Grant | May 7, 1935 |
| 2,094,211 | Grant | Sept. 28, 1937 |

| | | |
|---|---|---|
| 2,121,357 | Lindsey | June 21, 1938 |
| 2,122,768 | Young | July 5, 1938 |
| 2,287,784 | Cunningham | June 30, 1942 |
| 2,333,263 | McCabe | Nov. 2, 1943 |
| 2,599,623 | Forrester | June 10, 1952 |
| 2,663,859 | MacInnes | Dec. 22, 1953 |
| 2,696,524 | Huntington | Dec. 7, 1954 |
| 2,712,642 | Jennings | July 5, 1955 |